(12) United States Patent
Gießelmann

(10) Patent No.: US 7,688,486 B2
(45) Date of Patent: Mar. 30, 2010

(54) METHODS AND APPARATUS FOR PROFILING COLOR OUTPUT DEVICES

(75) Inventor: Markus Gießelmann, Bad Oeynhausen (DE)

(73) Assignee: Electronics for Imaging, Inc., Foster City, CA (US)

( * ) Notice: Subject to any disclaimer, the term of this patent is extended or adjusted under 35 U.S.C. 154(b) by 1152 days.

(21) Appl. No.: 10/836,070

(22) Filed: Apr. 30, 2004

(65) Prior Publication Data

US 2005/0243335 A1 Nov. 3, 2005

(51) Int. Cl.
*H04N 1/60* (2006.01)
(52) U.S. Cl. .................. 358/504; 358/1.9; 358/518; 382/167; 382/274
(58) Field of Classification Search ................ 358/1.9, 358/504, 518; 382/167, 274
See application file for complete search history.

(56) References Cited

U.S. PATENT DOCUMENTS

| | | | | |
|---|---|---|---|---|
| 6,072,589 | A * | 6/2000 | Rozzi | 358/1.9 |
| 6,381,037 | B1 * | 4/2002 | Balasubramanian et al. | 358/3.23 |
| 6,483,607 | B1 * | 11/2002 | Van de Capelle et al. | 358/1.9 |
| 7,064,860 | B1 * | 6/2006 | Balasubramanian et al. | 358/1.9 |
| 7,298,526 | B2 * | 11/2007 | Bailey | 358/1.9 |
| 2003/0058459 | A1 | 3/2003 | Wu et al. | |
| 2003/0123072 | A1 * | 7/2003 | Spronk | 358/1.9 |

OTHER PUBLICATIONS

Mark Shaw et al, Color Printer Characterization Adjustment for Different Substrates, Dec. 2003, Wiley Periodicals, Inc, vol. 28 Num. 6, pp. 454-467.*
Raja Balasubramanian, "A Printer Model For Dot-On-Dot Halftone Screens," Proc. SPIE, vol. 2413, pp. 356-364 (Feb. 6, 1995).

* cited by examiner

*Primary Examiner*—King Y Poon
*Assistant Examiner*—Jamares Washington
(74) *Attorney, Agent, or Firm*—Michael A. Glenn; Glenn Patent Group

(57) ABSTRACT

Methods and apparatus are provided for generating a color profile for a color output device including a plurality of colorants, the methods and apparatus printing a plurality of color patches on an output medium, measuring a spectral or colorimetric response for each of the printed patches and for the output medium, calculating spectral or colorimetric responses for overprint combinations of the colorants based on the measured spectral or colorimetric responses, calculating colorimetric values in a profiling target based on the calculated and measured responses, and providing the calculated colorimetric values to profiling software for generation of the color profile.

14 Claims, 10 Drawing Sheets

| C | M | Y | K | C | M | Y | K | C | M | Y | K |
|---|---|---|---|---|---|---|---|---|---|---|---|
| 49.4 | 74.5 | 100.0 | 0.0 | 0.0 | 49.4 | 49.4 | 0.0 | 0.0 | 49.4 | 49.4 | 74.5 |
| 100.0 | 100.0 | 66.7 | 49.4 | 32.9 | 32.9 | 32.9 | 49.4 | 66.7 | 32.9 | 0.0 | 24.7 |
| 66.7 | 100.0 | 32.9 | 24.7 | 66.7 | 66.7 | 0.0 | 24.7 | 100.0 | 32.9 | 32.9 | 49.4 |
| 66.7 | 100.0 | 0.0 | 49.4 | 24.7 | 24.7 | 49.4 | 0.0 | 49.4 | 100.0 | 100.0 | 0.0 |
| 100.0 | 74.5 | 49.4 | 0.0 | 0.0 | 100.0 | 0.0 | 74.5 | 100.0 | 100.0 | 100.0 | 0.0 |
| 74.5 | 100.0 | 100.0 | 0.0 | 24.7 | 0.0 | 74.5 | 0.0 | 100.0 | 66.7 | 0.0 | 24.7 |
| 100.0 | 100.0 | 0.0 | 100.0 | 66.7 | 100.0 | 66.7 | 24.7 | 100.0 | 32.9 | 32.9 | 24.7 |
| 63.9 | 63.9 | 63.9 | 87.1 | 66.7 | 66.7 | 100.0 | 49.4 | 0.0 | 0.0 | 24.7 | 0.0 |
| 100.0 | 32.9 | 100.0 | 49.4 | 32.9 | 32.9 | 100.0 | 49.4 | 66.7 | 100.0 | 100.0 | 49.4 |
| 100.0 | 32.9 | 100.0 | 24.7 | 66.7 | 66.7 | 66.7 | 49.4 | 24.7 | 49.4 | 100.0 | 0.0 |
| 0.0 | 100.0 | 32.9 | 49.4 | 74.5 | 100.0 | 74.5 | 0.0 | 32.9 | 66.7 | 66.7 | 24.7 |
| 74.5 | 74.5 | 100.0 | 0.0 | 32.9 | 100.0 | 32.9 | 24.7 | 0.0 | 0.0 | 0.0 | 24.7 |
| 100.0 | 0.0 | 0.0 | 100.0 | 0.0 | 0.0 | 0.0 | 100.0 | 32.9 | 32.9 | 32.9 | 24.7 |
| 0.0 | 0.0 | 0.0 | 62.0 | 0.0 | 0.0 | 100.0 | 24.7 | 100.0 | 0.0 | 74.5 | 0.0 |
| 0.0 | 0.0 | 100.0 | 100.0 | 49.4 | 49.4 | 100.0 | 0.0 | 32.9 | 66.7 | 32.9 | 49.4 |
| 100.0 | 32.9 | 66.7 | 49.4 | 100.0 | 100.0 | 24.7 | 0.0 | 100.0 | 0.0 | 100.0 | 100.0 |
| 87.1 | 87.1 | 87.1 | 0.0 | 32.9 | 0.0 | 32.9 | 49.4 | 32.9 | 0.0 | 100.0 | 24.7 |
| 32.9 | 32.9 | 0.0 | 49.4 | 100.0 | 66.7 | 66.7 | 49.4 | 24.7 | 74.5 | 24.7 | 0.0 |
| 32.9 | 100.0 | 100.0 | 24.7 | 100.0 | 49.4 | 0.0 | 0.0 | 0.0 | 49.4 | 100.0 | 74.5 |
| 24.7 | 0.0 | 49.4 | 0.0 | 0.0 | 0.0 | 36.9 | 0.0 | 0.0 | 36.9 | 0.0 | 0.0 |
| 49.4 | 0.0 | 74.5 | 0.0 | 0.0 | 0.0 | 0.0 | 74.5 | 32.9 | 0.0 | 0.0 | 24.7 |
| 0.0 | 100.0 | 32.9 | 24.7 | 62.0 | 62.0 | 62.0 | 0.0 | 49.4 | 0.0 | 49.4 | 0.0 |
| 7.5 | 0.0 | 0.0 | 0.0 | 0.0 | 100.0 | 66.7 | 49.4 | 0.0 | 24.7 | 100.0 | 0.0 |
| 74.5 | 24.7 | 0.0 | 0.0 | 49.4 | 24.7 | 0.0 | 0.0 | 0.0 | 7.5 | 0.0 | 0.0 |
| 74.5 | 0.0 | 0.0 | 0.0 | 100.0 | 0.0 | 24.7 | 0.0 | 100.0 | 49.4 | 74.5 | 0.0 |
| 0.0 | 0.0 | 87.1 | 0.0 | 0.0 | 100.0 | 100.0 | 0.0 | 2.8 | 2.8 | 2.8 | 9.4 |
| 100.0 | 100.0 | 100.0 | 24.7 | 0.0 | 32.9 | 66.7 | 49.4 | 0.0 | 100.0 | 49.4 | 74.5 |
| 66.7 | 0.0 | 32.9 | 49.4 | 0.0 | 0.0 | 0.0 | 7.5 | 74.5 | 0.0 | 24.7 | 0.0 |
| 0.0 | 100.0 | 49.4 | 0.0 | 32.9 | 0.0 | 66.7 | 49.4 | 100.0 | 100.0 | 32.9 | 24.7 |
| 0.0 | 32.9 | 0.0 | 49.4 | 0.0 | 100.0 | 0.0 | 24.7 | 100.0 | 24.7 | 100.0 | 0.0 |
| 3.5 | 0.0 | 0.0 | 0.0 | 0.0 | 87.1 | 0.0 | 0.0 | 74.5 | 49.4 | 49.4 | 0.0 |
| 0.0 | 0.0 | 0.0 | 49.4 | 0.0 | 49.4 | 0.0 | 0.0 | 14.5 | 14.5 | 14.5 | 0.0 |
| 24.7 | 49.4 | 24.7 | 0.0 | 16.1 | 16.1 | 16.1 | 43.9 | 49.4 | 74.5 | 74.5 | 0.0 |
| 1.2 | 1.2 | 1.2 | 5.1 | 100.0 | 0.0 | 100.0 | 24.7 | 0.0 | 11.4 | 0.0 | 0.0 |
| 74.5 | 0.0 | 49.4 | 0.0 | 32.9 | 66.7 | 32.9 | 24.7 | 32.9 | 0.0 | 100.0 | 49.4 |
| 100.0 | 24.7 | 74.5 | 0.0 | 100.0 | 100.0 | 100.0 | 49.4 | 0.0 | 0.0 | 66.7 | 49.4 |
| 49.4 | 100.0 | 100.0 | 74.5 | 32.9 | 66.7 | 100.0 | 24.7 | 66.7 | 100.0 | 0.0 | 24.7 |

FIG. 4A

| C | M | Y | K | C | M | Y | K | C | M | Y | K |
|---|---|---|---|---|---|---|---|---|---|---|---|
| 100.0 | 74.5 | 74.5 | 0.0 | 24.7 | 74.5 | 49.4 | 0.0 | 0.0 | 24.7 | 74.5 | 0.0 |
| 24.7 | 49.4 | 0.0 | 0.0 | 66.7 | 32.9 | 100.0 | 49.4 | 49.4 | 100.0 | 49.4 | 74.5 |
| 74.5 | 49.4 | 74.5 | 0.0 | 100.0 | 0.0 | 32.9 | 24.7 | 66.7 | 100.0 | 66.7 | 49.4 |
| 49.4 | 0.0 | 24.7 | 0.0 | 0.0 | 66.7 | 0.0 | 24.7 | 49.4 | 49.4 | 49.4 | 0.0 |
| 24.7 | 74.5 | 100.0 | 0.0 | 49.4 | 49.4 | 0.0 | 0.0 | 74.5 | 74.5 | 49.4 | 0.0 |
| 49.4 | 0.0 | 100.0 | 0.0 | 66.7 | 100.0 | 100.0 | 24.7 | 32.9 | 32.9 | 66.7 | 24.7 |
| 32.9 | 32.9 | 66.7 | 49.4 | 0.0 | 100.0 | 24.7 | 0.0 | 0.0 | 32.9 | 100.0 | 24.7 |
| 0.0 | 3.5 | 0.0 | 0.0 | 100.0 | 49.4 | 49.4 | 74.5 | 100.0 | 0.0 | 66.7 | 49.4 |
| 100.0 | 66.7 | 100.0 | 49.4 | 32.9 | 100.0 | 66.7 | 24.7 | 66.7 | 0.0 | 100.0 | 24.7 |
| 100.0 | 100.0 | 74.5 | 0.0 | 0.0 | 100.0 | 0.0 | 0.0 | 66.7 | 66.7 | 100.0 | 24.7 |
| 0.0 | 74.5 | 74.5 | 0.0 | 66.7 | 66.7 | 66.7 | 24.7 | 49.4 | 100.0 | 74.5 | 0.0 |
| 74.5 | 74.5 | 0.0 | 0.0 | 62.0 | 0.0 | 0.0 | 0.0 | 66.7 | 0.0 | 32.9 | 24.7 |
| 100.0 | 100.0 | 0.0 | 24.7 | 100.0 | 49.4 | 100.0 | 74.5 | 0.0 | 100.0 | 66.7 | 24.7 |
| 49.4 | 49.4 | 74.5 | 0.0 | 74.5 | 100.0 | 0.0 | 0.0 | 100.0 | 0.0 | 49.4 | 74.5 |
| 36.9 | 0.0 | 0.0 | 0.0 | 100.0 | 74.5 | 24.7 | 0.0 | 0.0 | 0.0 | 0.0 | 87.1 |
| 0.0 | 0.0 | 100.0 | 0.0 | 34.9 | 34.9 | 34.9 | 68.6 | 100.0 | 49.4 | 0.0 | 74.5 |
| 0.0 | 49.4 | 0.0 | 74.5 | 32.9 | 100.0 | 100.0 | 49.4 | 100.0 | 49.4 | 24.7 | 0.0 |
| 0.0 | 74.5 | 100.0 | 0.0 | 100.0 | 32.9 | 66.7 | 24.7 | 66.7 | 32.9 | 0.0 | 49.4 |
| 100.0 | 100.0 | 0.0 | 49.4 | 0.0 | 62.0 | 0.0 | 0.0 | 0.0 | 0.0 | 0.0 | 36.9 |
| 0.0 | 0.0 | 3.5 | 0.0 | 0.0 | 24.7 | 0.0 | 0.0 | 0.0 | 0.0 | 7.5 | 0.0 |
| 0.0 | 0.0 | 100.0 | 74.5 | 100.0 | 66.7 | 0.0 | 49.4 | 100.0 | 0.0 | 0.0 | 74.5 |
| 66.7 | 32.9 | 32.9 | 49.4 | 74.5 | 24.7 | 100.0 | 0.0 | 32.9 | 0.0 | 32.9 | 24.7 |
| 49.4 | 49.4 | 0.0 | 74.5 | 7.5 | 7.5 | 7.5 | 0.0 | 32.9 | 100.0 | 0.0 | 24.7 |
| 74.5 | 0.0 | 74.5 | 0.0 | 66.7 | 66.7 | 32.9 | 49.4 | 49.4 | 49.4 | 24.7 | 0.0 |
| 0.0 | 100.0 | 100.0 | 24.7 | 0.0 | 32.9 | 0.0 | 24.7 | 0.0 | 74.5 | 24.7 | 0.0 |
| 49.4 | 100.0 | 0.0 | 0.0 | 87.1 | 0.0 | 0.0 | 0.0 | 32.9 | 66.7 | 0.0 | 49.4 |
| 74.5 | 24.7 | 24.7 | 0.0 | 32.9 | 100.0 | 0.0 | 49.4 | 0.0 | 66.7 | 100.0 | 24.7 |
| 100.0 | 100.0 | 100.0 | 74.5 | 49.4 | 0.0 | 0.0 | 0.0 | 49.4 | 24.7 | 24.7 | 0.0 |
| 0.0 | 32.9 | 100.0 | 49.4 | 74.5 | 100.0 | 24.7 | 0.0 | 100.0 | 74.5 | 100.0 | 0.0 |
| 66.7 | 32.9 | 66.7 | 24.7 | 32.9 | 66.7 | 0.0 | 24.7 | 66.7 | 32.9 | 66.7 | 49.4 |
| 24.7 | 74.5 | 74.5 | 0.0 | 0.0 | 49.4 | 100.0 | 0.0 | 0.0 | 66.7 | 66.7 | 24.7 |
| 100.0 | 100.0 | 0.0 | 74.5 | 24.7 | 0.0 | 24.7 | 0.0 | 0.0 | 49.4 | 74.5 | 0.0 |
| 49.4 | 0.0 | 0.0 | 74.5 | 0.0 | 0.0 | 0.0 | 0.0 | 24.7 | 0.0 | 0.0 | 0.0 |
| 100.0 | 24.7 | 0.0 | 0.0 | 0.0 | 0.0 | 74.5 | 0.0 | 24.7 | 100.0 | 74.5 | 0.0 |
| 0.0 | 66.7 | 32.9 | 49.4 | 74.5 | 100.0 | 49.4 | 0.0 | 0.0 | 74.5 | 49.4 | 0.0 |
| 24.7 | 49.4 | 49.4 | 0.0 | 49.4 | 24.7 | 74.5 | 0.0 | 0.0 | 100.0 | 0.0 | 100.0 |
| 24.7 | 49.4 | 74.5 | 0.0 | 0.0 | 100.0 | 100.0 | 49.4 | 49.4 | 74.5 | 0.0 | 0.0 |

FIG. 4B

| C | M | Y | K | C | M | Y | K |
|---|---|---|---|---|---|---|---|
| 24.7 | 0.0 | 100.0 | 0.0 | 100.0 | 0.0 | 100.0 | 0.0 |
| 100.0 | 32.9 | 0.0 | 24.7 | 100.0 | 0.0 | 100.0 | 49.4 |
| 0.0 | 74.5 | 0.0 | 0.0 | 100.0 | 66.7 | 100.0 | 24.7 |
| 0.0 | 0.0 | 32.9 | 49.4 | 74.5 | 49.4 | 24.7 | 0.0 |
| 32.9 | 66.7 | 100.0 | 49.4 | 100.0 | 0.0 | 66.7 | 24.7 |
| 0.0 | 32.9 | 66.7 | 24.7 | 100.0 | 0.0 | 0.0 | 49.4 |
| 0.0 | 0.0 | 0.0 | 11.4 | 0.0 | 100.0 | 100.0 | 100.0 |
| 100.0 | 66.7 | 66.7 | 24.7 | 66.7 | 100.0 | 32.9 | 49.4 |
| 49.4 | 0.0 | 49.4 | 74.5 | 74.5 | 74.5 | 74.5 | 0.0 |
| 100.0 | 0.0 | 32.9 | 49.4 | 0.0 | 66.7 | 66.7 | 49.4 |
| 74.5 | 24.7 | 49.4 | 0.0 | 100.0 | 49.4 | 100.0 | 0.0 |
| 66.7 | 32.9 | 100.0 | 24.7 | 0.0 | 0.0 | 66.7 | 24.7 |
| 66.7 | 32.9 | 32.9 | 24.7 | 100.0 | 100.0 | 49.4 | 74.5 |
| 74.5 | 24.7 | 74.5 | 0.0 | 49.4 | 100.0 | 24.7 | 0.0 |
| 49.4 | 74.5 | 24.7 | 0.0 | 0.0 | 100.0 | 74.5 | 0.0 |
| 0.0 | 66.7 | 100.0 | 49.4 | 100.0 | 100.0 | 32.9 | 49.4 |
| 0.0 | 49.4 | 24.7 | 0.0 | 74.5 | 49.4 | 100.0 | 0.0 |
| 74.5 | 49.4 | 0.0 | 0.0 | 24.7 | 24.7 | 0.0 | 0.0 |
| 32.9 | 66.7 | 66.7 | 49.4 | 0.0 | 24.7 | 49.4 | 0.0 |
| 100.0 | 74.5 | 0.0 | 0.0 | 0.0 | 0.0 | 11.4 | 0.0 |
| 100.0 | 100.0 | 0.0 | 0.0 | 0.0 | 0.0 | 49.4 | 0.0 |
| 32.9 | 0.0 | 66.7 | 24.7 | 3.5 | 3.5 | 3.5 | 14.5 |
| 100.0 | 0.0 | 100.0 | 74.5 | 0.0 | 100.0 | 100.0 | 74.5 |
| 100.0 | 66.7 | 32.9 | 24.7 | 100.0 | 0.0 | 49.4 | 0.0 |
| 24.7 | 24.7 | 24.7 | 0.0 | 0.0 | 0.0 | 32.9 | 24.7 |
| 49.4 | 100.0 | 49.4 | 0.0 | 24.7 | 74.5 | 0.0 | 0.0 |
| 24.7 | 100.0 | 24.7 | 0.0 | 32.9 | 0.0 | 0.0 | 49.4 |
| 0.0 | 100.0 | 0.0 | 49.4 | 0.0 | 0.0 | 62.0 | 0.0 |
| 11.4 | 0.0 | 0.0 | 0.0 | 66.7 | 0.0 | 0.0 | 24.7 |
| 49.4 | 49.4 | 49.4 | 74.5 | 24.7 | 24.7 | 100.0 | 0.0 |
| 0.0 | 66.7 | 0.0 | 49.4 | 100.0 | 32.9 | 0.0 | 49.4 |
| 0.0 | 32.9 | 32.9 | 24.7 | 100.0 | 100.0 | 49.4 | 0.0 |
| 0.0 | 0.0 | 0.0 | 3.5 | 32.9 | 32.9 | 100.0 | 24.7 |
| 66.7 | 0.0 | 66.7 | 49.4 | 0.0 | 66.7 | 32.9 | 24.7 |
| 0.0 | 0.0 | 49.4 | 74.5 | 100.0 | 100.0 | 66.7 | 24.7 |
| 66.7 | 0.0 | 0.0 | 49.4 | 100.0 | 49.4 | 49.4 | 0.0 |
| 24.7 | 24.7 | 74.5 | 0.0 | 100.0 | 24.7 | 49.4 | 0.0 |

FIG. 4C

METHODS AND APPARATUS FOR PROFILING COLOR OUTPUT DEVICES

BACKGROUND

This invention relates to color image processing. More particularly, this invention relates to methods and apparatus for profiling color output devices.

A profile for a color output device (referred to herein as a "color profile"), includes transformations between the color space of the color output device and a profile connection space, such as Commission Internationale de l'Eclairage ("CIE") XYZ, or other similar profile connection space. A color profile typically is produced in accordance with the profile specification of the International Color Consortium ("ICC"), and hence is referred to as an "ICC profile." A profile connection space derived from the XYZ color space is commonly known as the CIE LAB color space, which expresses color values in a rectangular coordinate system, with L, a, and b values each corresponding to one of the three dimensions in the system.

An ICC profile generally includes a transform from the profile connection space to the device space (the "forward transform"), and a transform from the device space to the profile connection space (the "backwards transform"). For example, if a color output device is a four-color printer that uses cyan, yellow, magenta and black ("CMYK") colorants, the forward transform may be used to convert device-independent LAB colorant values to equivalent device-dependent CMYK colorant values, and the backwards transform may be used to convert device-dependent CMYK colorant values to device-independent LAB colorant values.

To create a color profile for a color output device, such as a printer, copier, offset press, or other similar color output device, a test chart including numerous color patches is printed on media, such as paper, by the color output device. Exemplary test charts include IT8, ECI2002, and other similar test charts. Next, a measurement device, such as a calorimeter, spectrophotometer, spectrocolorimeter, or other similar device is used to obtain spectral or colorimetric data that describes each printed patch. The measured data are then provided to profile generation software, which calculates a color profile based on the spectral or colorimetric measurements. Profile generation software may be any conventional profile generation software, such as the EFI Color Profiler software, licensed by Electronics for Imaging, Inc., Foster City, Calif., U.S.A., or other similar profile generation software.

Previously known techniques for creating color profiles have several disadvantages. First, conventional test charts include a large number of color patches, and therefore are time-consuming to measure. Indeed, a conventional IT8 test chart includes more than 900 test patches, and a conventional ECI2002 test chart includes more than 1,400 color patches. In addition, because such a large number of measurements must be taken, the risk of measurement errors becomes significantly increased.

Second, conventional test charts use a relatively large amount of space on the output media, and therefore may require a special print run solely for purposes of printing the test charts. Indeed, a conventional IT8 test chart may be more than 600 cm$^2$ and an ECI2002 test chart may be more than 1,200 cm$^2$. Because such test charts often are too large to print alongside a print job, it may be very costly to print test charts on the color output device. For example, to print a conventional test chart on an offset printing press, the press typically must be taken offline, special plates must be installed on the press that include images of the test chart, the press must be restarted, and the test chart must be printed on several thousand sheets of output media. Such a process not only consumes valuable resources such as output media and ink, but also constitutes costly downtime during which the press is not being used for revenue-generating operations.

In view of the foregoing, it would be desirable to provide methods and apparatus for reducing the number of color samples that must be printed when profiling a color output device.

It further would be desirable to provide methods and apparatus for reducing the time required to profile a color output device.

It also would be desirable to provide methods and apparatus for reducing the risk of measurement error while profiling a color output device.

It additionally would be desirable to provide methods and apparatus for reducing the size of a test chart that must be printed while profiling a color output device.

SUMMARY

In view of the foregoing, it is an object of this invention to provide methods and apparatus for reducing the number of color samples that must be printed when profiling a color output device.

In view of the foregoing, it further is an object of this invention to provide methods and apparatus for reducing the time required to profile a color output device.

It also is an object of this invention to provide methods and apparatus for reducing the risk of measurement error while profiling a color output device.

It additionally is an object of this invention to provide methods and apparatus for reducing the size of a test chart that must be printed while profiling a color output device.

These and other objects of this invention are accomplished by providing methods and apparatus that print a plurality of solid color patches on an output medium, measure a spectral response for each of the printed patches and for the output medium, calculate spectral responses for overprint combinations of the colorants based on the measured spectral responses, calculate colorimetric values in a profiling target based on the calculated and measured spectral responses, and provide the calculated calorimetric values to profiling software for generation of the color profile.

In an alternative embodiment of this invention, methods and apparatus are provided that print a plurality of solid color patches on an output medium, measure a calorimetric value for each of the printed patches and for the output medium, calculate colorimetric values in a profiling target based on the measured colorimetric values, and provide the calculated colorimetric values to profiling software for generation of the color profile.

In another alternative embodiment of this invention, methods and apparatus are provided that print a plurality of solid color and midtone patches on an output medium, measure a spectral response for each of the printed patches and for the output medium, interpolate the measured spectral responses to determine spectral responses of shades of the colorants, calculate spectral responses for overprint combinations of the colorants based on the measured and interpolated spectral responses, calculate calorimetric values in a profiling target based on the calculated, measured and interpolated spectral responses, and provide the calculated calorimetric values to profiling software for generation of the color profile.

In still another alternative embodiment of this invention, methods and apparatus are provided that print a plurality of solid color, midtone and overprint patches on an output medium, measure a spectral response for each of the printed patches and for the output medium, interpolate the measured spectral responses to determine spectral responses of shades of the colorants, convert the measured and interpolated spectral responses to colorimetric values, calculate calorimetric values in a profiling target based on the converted calorimetric values, and provide the calculated colorimetric values to profiling software for generation of the color profile.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which:

FIGS. 4A-4C are tables of exemplary colorant values for patches used in a color profile target;

DETAILED DESCRIPTION

Figure 1:
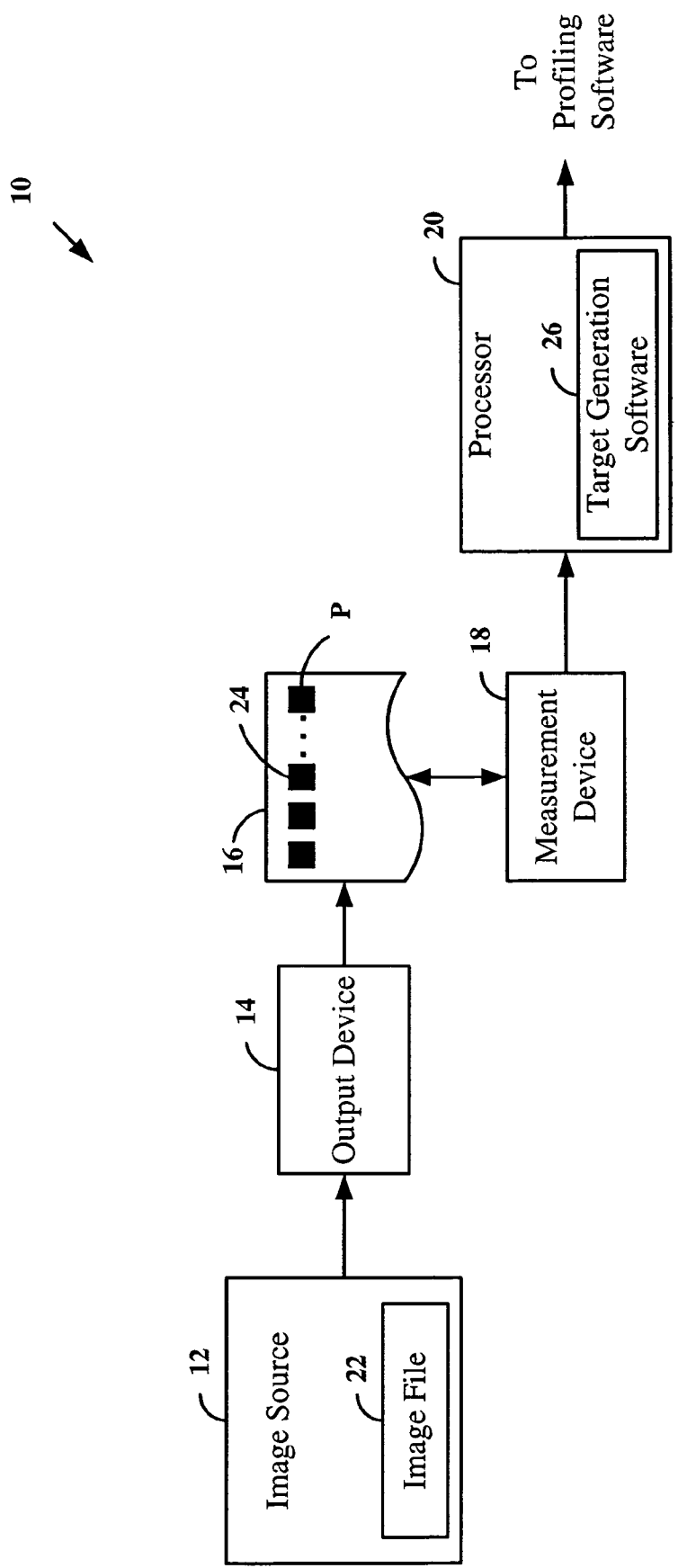
FIG. 1 is a block diagram of an exemplary color profiling system in accordance with this invention

Referring to FIG. 1, an exemplary color profiling system in accordance with this invention is described. Color profiling system 10 includes image source 12, color output device 14, output page 16, measurement device 18 and processor 20. Image source 12 includes image file 22 that includes digital data representing test pattern 24 to be printed by color output device 14. Image source 12 may be a personal computer, laptop computer, handheld computer, computer workstation, print server, personal digital assistant, or any other similar device that may be used to provide image files for printing by color output devices.

Image source 12 may include a software application (not shown) used to generate image file 22. For example, image source 12 may be a personal computer that includes software that may be used to generate image file 22. Image file 22 may be a digital data file that describes test pattern 24 in a page description language, such as PostScript, PCL, or other similar page description language, or may simply be a raster image, such as a TIFF image, RAW image, or other similar raster image. Color output device 14 may be a laser printer, inkjet printer, offset press, or other similar color output device that uses one or more colorants to provide output page 16 including test pattern 24. For example, color output device 14 may be a four-color offset press that uses CMYK colorants, or other similar multi-colorant output device. Test pattern 24 includes one or more color patches P.

Measurement device 18 may be any conventional measurement device, such as a spectrophotometer, spectrocolorimeter, or other similar device, that may be used to provide spectral data $R(\lambda)$ that describes printed samples, such as color patches P. For example, measurement device 18 may be a Spectrolino spectrophotometer manufactured by Gretag-Macbeth LLC, New Windsor, N.Y., U.S.A. As described in more detail below, in some embodiments of this invention, measurement device 18 may be a measurement device that also or alternatively provides colorimetric data, such as CIE LAB data (referred to herein as "LAB data"), CIE XYZ data (referred to herein as "XYZ data"), CIE LCH data (referred to herein as "LCH data"), or other similar colorimetric data that describes printed samples, such as color patches P.

Processor 20 may be a personal computer, laptop computer, handheld computer, computer workstation, print server, personal digital assistant, or any other similar device. Processor 20 includes target generation software program 26 that implements methods in accordance with this invention for receiving spectral data $R(\lambda)$ (or colorimetric data) from measurement device 18, and calculating therefrom calorimetric data describing standard target patches used for generating color profiles. Persons of ordinary skill in the art will understand that the functions of processor 20 may be implemented by image source 12.

Figure 2:
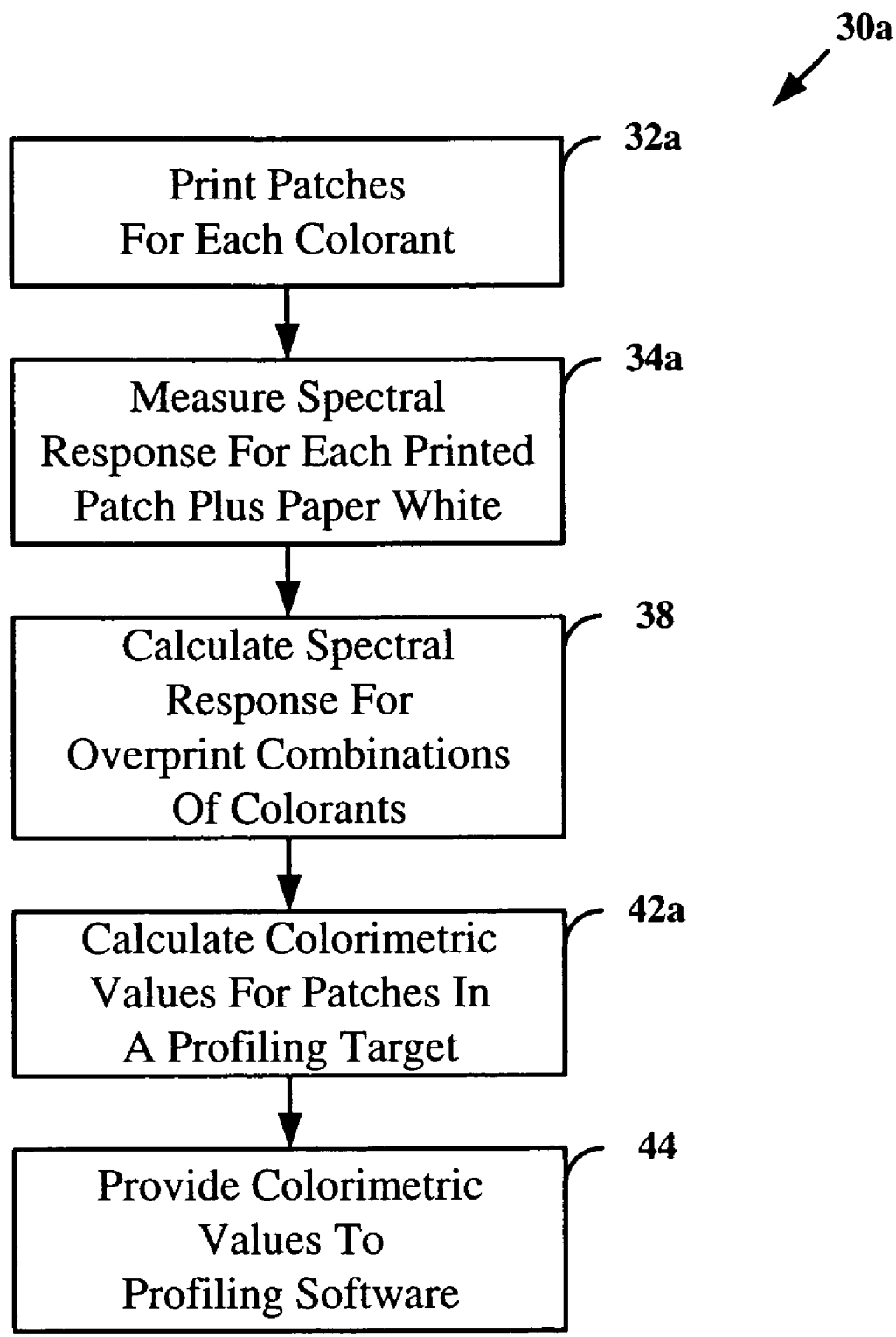
FIG. 2 is a flowchart of an exemplary color profiling method in accordance with this invention.
Figures 3A, 3B:
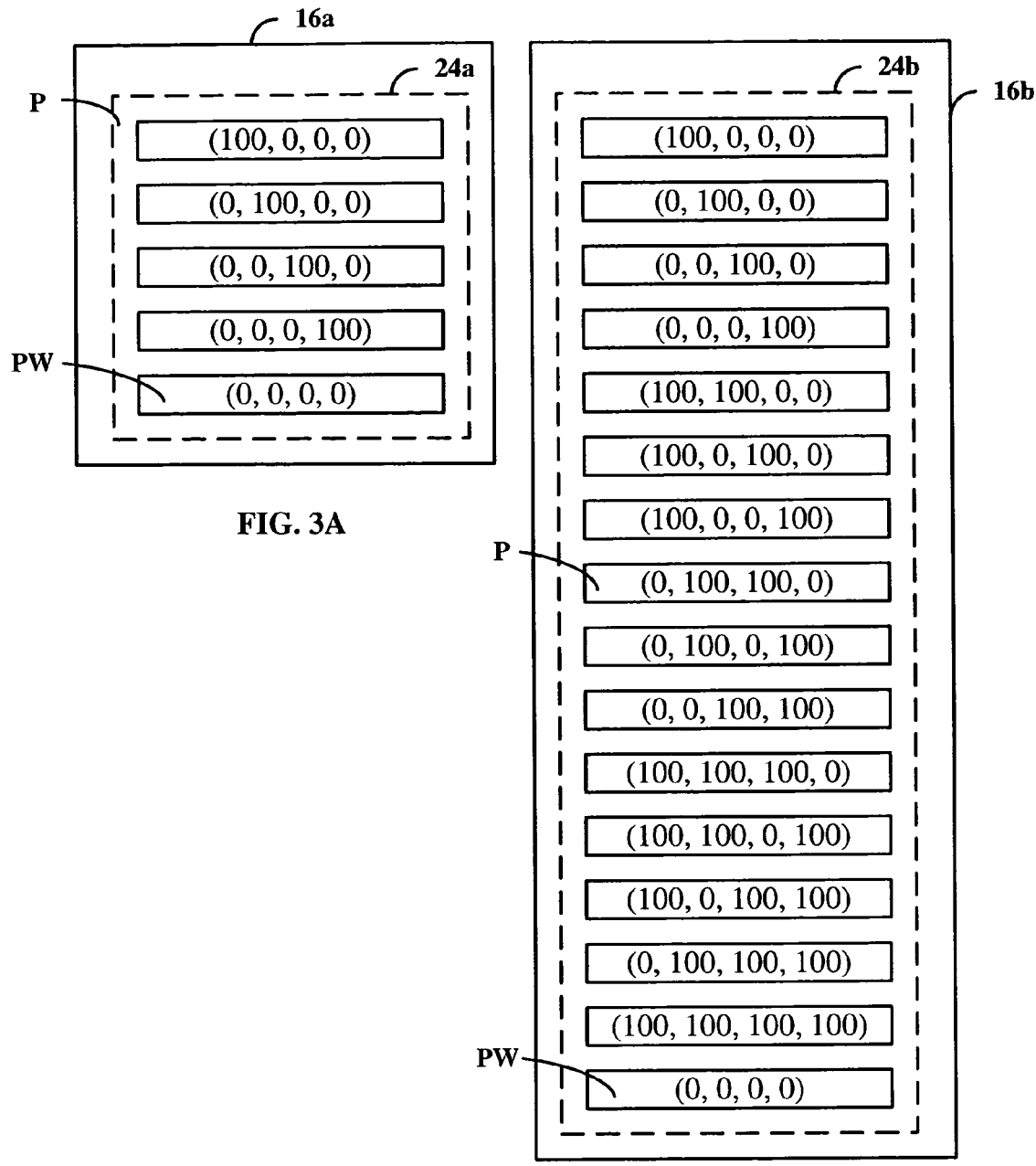
FIGS. 3A-3D are diagrams of exemplary test patterns for use with color profiling methods in accordance with this invention.

Referring now to FIGS. 1 and 2, an exemplary method 30a for profiling a color output device in accordance with this invention is described. Beginning at step 32a, color output device 14 is used to print test pattern 24a including printed test patches P on output page 16. For example, a user of image source 12 may issue a print command to print image file 22a on color output device 14. An exemplary output page 16a including exemplary test pattern 24a is illustrated in FIG. 3A. Test pattern 24a includes four printed patches P plus paper white patch PW (i.e., the output media). Persons of ordinary skill in the art will understand that test pattern 24a may include more than four printed test patches P. However, because test pattern 24a includes a relatively small number of printed patches P, the test pattern may be printed alongside a print job, or in the trim area of a print job. Each printed test patch P is comprised of a corresponding specified percentage of colorants (e.g., C, M, Y and K) used by color output device 14. In particular, test pattern 24a includes one patch for each colorant at 100% (i.e., solid colorant patches).

Referring again to FIGS. 1 and 2, at step 34a, the spectral response is determined for each printed test patch P and paper white patch PW in test pattern 24a. For example, measurement device 18 may be used to determine spectral response data $R(\lambda)$ for each printed test patch P and paper white patch PW on output page 16a. Thus, for the CMYK colorant system described above, the spectral responses $R_C(\lambda)$, $R_M(\lambda)$, $R_Y(\lambda)$, $R_K(\lambda)$, and $R_W(\lambda)$ are measured, where $R_C(\lambda)$ is the reflection spectra for the cyan patch, $R_M(\lambda)$ is the reflection spectra for the magenta patch, $R_Y(\lambda)$ is the reflection spectra for the yellow patch, $R_K(\lambda)$ is the reflection spectra for the black patch and $R_W(\lambda)$ is the reflection spectra for paper white patch PW.

Next, at step 38, the spectral response is calculated for overprinted combinations of colorants based on the spectral response data for the individual colorant patches measured in step 34a. Thus, for a CMYK colorant system, the following spectral responses are calculated: $R_{CM}(\lambda)$, $R_{CY}(\lambda)$, $R_{CK}(\lambda)$, $R_{MY}(\lambda)$, $R_{MK}(\lambda)$, $R_{YK}(\lambda)$, $R_{CMY}(\lambda)$, $R_{CMK}(\lambda)$, $R_{CYK}(\lambda)$, $R_{MYK}(\lambda)$, and $R_{CMYK}(\lambda)$, corresponding to cyan+magenta, cyan+yellow, cyan+black, magenta+yellow, magenta+black, yellow and black, cyan+magenta+yellow, cyan+magenta+black, cyan+yellow+black, magenta+yellow+black and cyan+magenta+yellow+black, respectively.

For example, the spectral responses of overprinted combination patches may be calculated using Beer's Law. In par ticular, the transmission spectra $T_i(\lambda)$ of the printed colorant patches are calculated using the following formula:

$$T_i(\lambda) = \frac{R_i(\lambda)}{R_W(\lambda)}$$

Thus, for a CMYK colorant system, the calculated transmission spectra are:

$$T_C(\lambda) = \frac{R_C(\lambda)}{R_W(\lambda)}$$

$$T_M(\lambda) = \frac{R_M(\lambda)}{R_W(\lambda)}$$

$$T_Y(\lambda) = \frac{R_Y(\lambda)}{R_W(\lambda)}$$

$$T_K(\lambda) = \frac{R_K(\lambda)}{R_W(\lambda)}$$

Next, the reflectance spectra are calculated for all overprinted combinations of colorants, as follows:

$$R_{CM}(\lambda) = R_C(\lambda)T_M(\lambda)$$

$$R_{CY}(\lambda) = R_C(\lambda)T_Y(\lambda)$$

$$R_{CK}(\lambda) = R_C(\lambda)T_K(\lambda)$$

$$R_{MY}(\lambda) = R_M(\lambda)T_Y(\lambda)$$

$$R_{MK}(\lambda) = R_M(\lambda)T_K(\lambda)$$

$$R_{YK}(\lambda) = R_Y(\lambda)T_K(\lambda)$$

$$R_{CMY}(\lambda) = R_C(\lambda)T_M(\lambda)T_Y(\lambda)$$

$$R_{CMK}(\lambda) = R_C(\lambda)T_M(\lambda)T_K(\lambda)$$

$$R_{CYK}(\lambda) = R_C(\lambda)T_Y(\lambda)T_K(\lambda)$$

$$R_{MYK}(\lambda) = R_M(\lambda)T_Y(\lambda)T_K(\lambda)$$

$$R_{CMYK}(\lambda) = R_C(\lambda)T_M(\lambda)T_Y(\lambda)T_K(\lambda)$$

Persons of ordinary skill in the art will understand that other techniques may be used to calculate the spectral response for overprinted combinations of colorants based on the measured spectral response data of the individual colorants. For example, the Kubela-Munk theory, or other similar technique may be used.

Referring again to FIGS. 1 and 2, at step 42a, colorimetric values are calculated for patches used in a profiling target, such as patches having the colorant values shown in FIGS. 4A-C, based on the reflectance spectra calculated in step 38. Any conventional technique may be used to calculate colorimetric values for such patches. For example, for color output devices that produce printed output by depositing dots on output media, the reflectance spectra $R(\lambda)$ for each patch may be calculated using spectral Neugebauer equations:

$$R(\lambda) = \Sigma f_i R_i(\lambda)$$

where $f_i$ is the fractional area coverage for the patch, and $R_i(\lambda)$ is the reflectance spectra of the colorants in the patch. For a CMYK patch having colorant values (c, m, y, k) the fractional area coverage for individual and overprinted combinations of colorants are:

$$f_W = (1-c)(1-m)(1-y)(1-k)$$

$$f_C = c(1-m)(1-y)(1-k)$$

$$f_M = (1-c)m(1-y)(1-k)$$

$$f_Y = (1-c)(1-m)y(1-k)$$

$$f_K = (1-c)(1-m)(1-y)k$$

$$f_{CM} = cm(1-y)(1-k)$$

$$f_{CY} = c(1-m)y(1-k)$$

$$f_{CK} = c(1-m)(1-y)k$$

$$f_{MY} = (1-c)my(1-k)$$

$$f_{MK} = (1-c)m(1-y)k$$

$$f_{YK} = (1-c)(1-m)yk$$

$$f_{CMY} = cmy(1-k)$$

$$f_{CMK} = cm(1-y)k$$

$$f_{CYK} = c(1-m)yk$$

$$f_{MYK} = (1-c)myk$$

$$f_{CMYK} = (1-c)(1-m)(1-y)(1-k)$$

Next, CIE tristimulus values XYZ may be determined from the calculated reflectance spectra for each patch in the color profiling target, as is known in the art. Referring again to FIGS. 1 and 2, at step 44, the colorimetric values calculated in step 42a may then be provided to any conventional profiling software for calculating the color profile for color output device 14.

Figure 5:
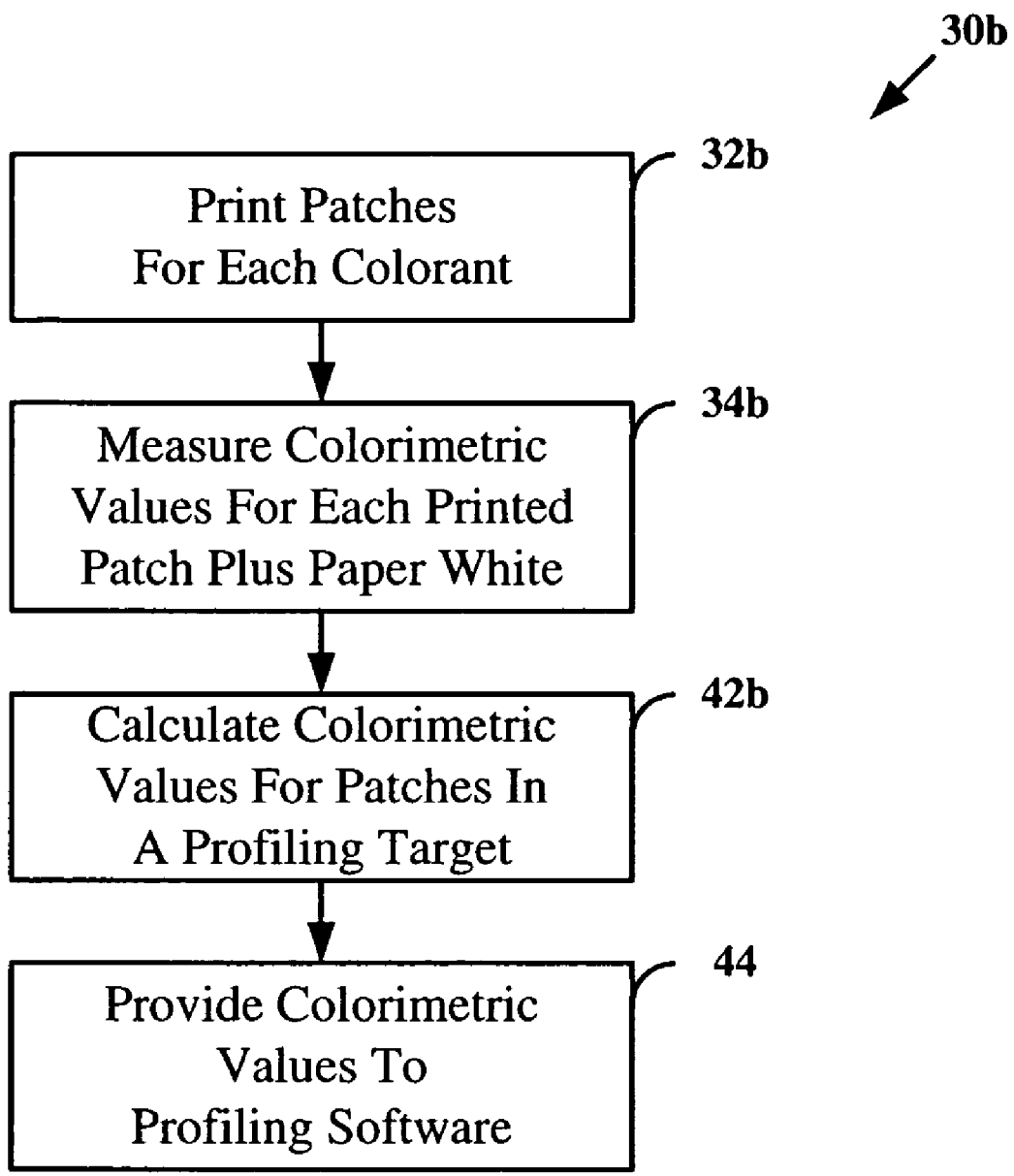
FIG. 5 is a flowchart of an alternative exemplary color profiling method in accordance with this invention.

Referring now to FIGS. 1 and 5, an alternative exemplary method 30b for profiling a color output device in accordance with this invention is described. In this alternative method, color output device 14 prints colorant patches for each of the individual colorants, plus overprint combinations of each colorant. In particular, beginning at step 32b, color output device 14 is used to print test pattern 24b including printed test patches P on output page 16b. For example, a user of image source 12 may issue a print command to print image file 22b on color output device 14. An exemplary output page 16b including exemplary test pattern 24b is illustrated in FIG. 3B Test pattern 24b includes fifteen printed patches P plus paper white patch P-W. Persons of ordinary skill in the art will understand that test pattern 24b may include more than fifteen printed test patches P. However, because test pattern 24b includes a relatively small number of printed patches P, the test pattern may be printed alongside a print job, or in the trim area of a print job. Each printed test patch P is comprised of a corresponding specified percentage of colorants (e.g., C, M, Y and K) used by color output device 14.

Referring again to FIGS. 1 and 5, at step 34b, colorimetric values are determined for each printed test patch P and paper white patch PW in test pattern 24a. For example, measurement device 18 may be used to determine XYZ values for each printed test patch P and paper white patch PW on output page 16b. Next, at step 42b, colorimetric values are calculated for patches used in a color profiling target, such as patches having the colorant values shown in FIGS. 4A-C, based on the colorimetric values measured in step 34b. Any conventional technique may be used to calculate colorimetric values for such patches. For example, the colorimetric values for each patch may be calculated using colorimetric Neugebauer equations:

$$X = \Sigma f_i X_i$$

$$Y = \Sigma f_i Y_i$$

$$Z = \Sigma f_i Z_i$$

where $f_i$ is the fractional area coverage for the patch (as described above), and $X_i$, $Y_i$ and $Z_i$ are the X, Y and Z values, respectively, of the colorants in the patch. Referring again to FIGS. 1 and 5, at step 44, the colorimetric values calculated in step 42b may then be provided to any conventional profiling software for calculating the color profile for color output device 14.

Figure 6:
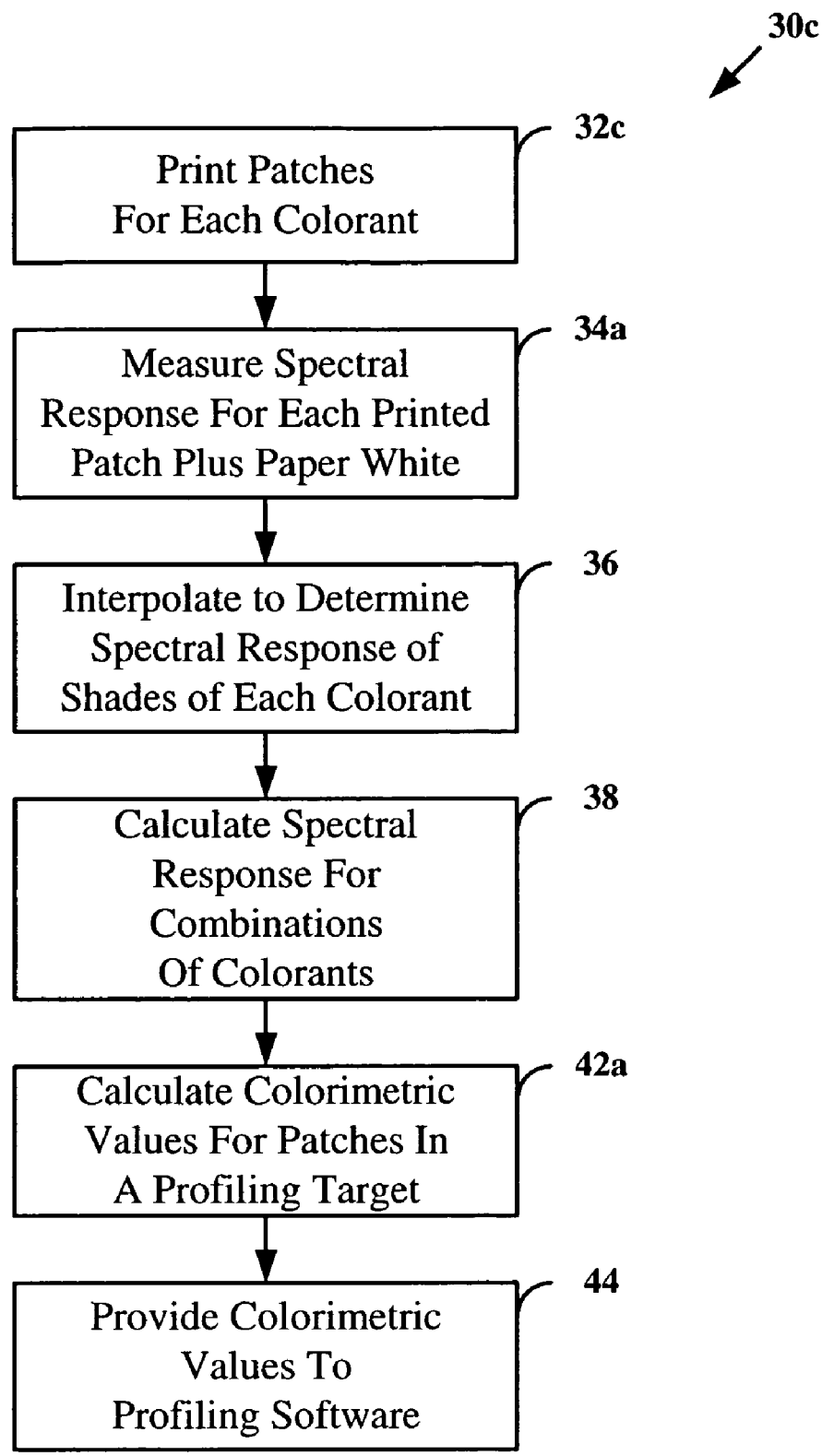
FIG. 6 is a flowchart of another alternative exemplary color profiling method in accordance with this invention.

The printed output of a conventional color output device, such as color output device 14, often exhibits a phenomenon known as dot gain, which is an increase in the size of a printed dot. Dot gain varies as a function of input value, and also varies from output device to output device. Methods for determining color profiles in accordance with this invention may be improved by accounting the effects of dot gain. Referring now to FIGS. 1 and 6, an alternative exemplary method in accordance with this invention that accounts for the effects of dot gain is described.

Figures 3C, 3D:
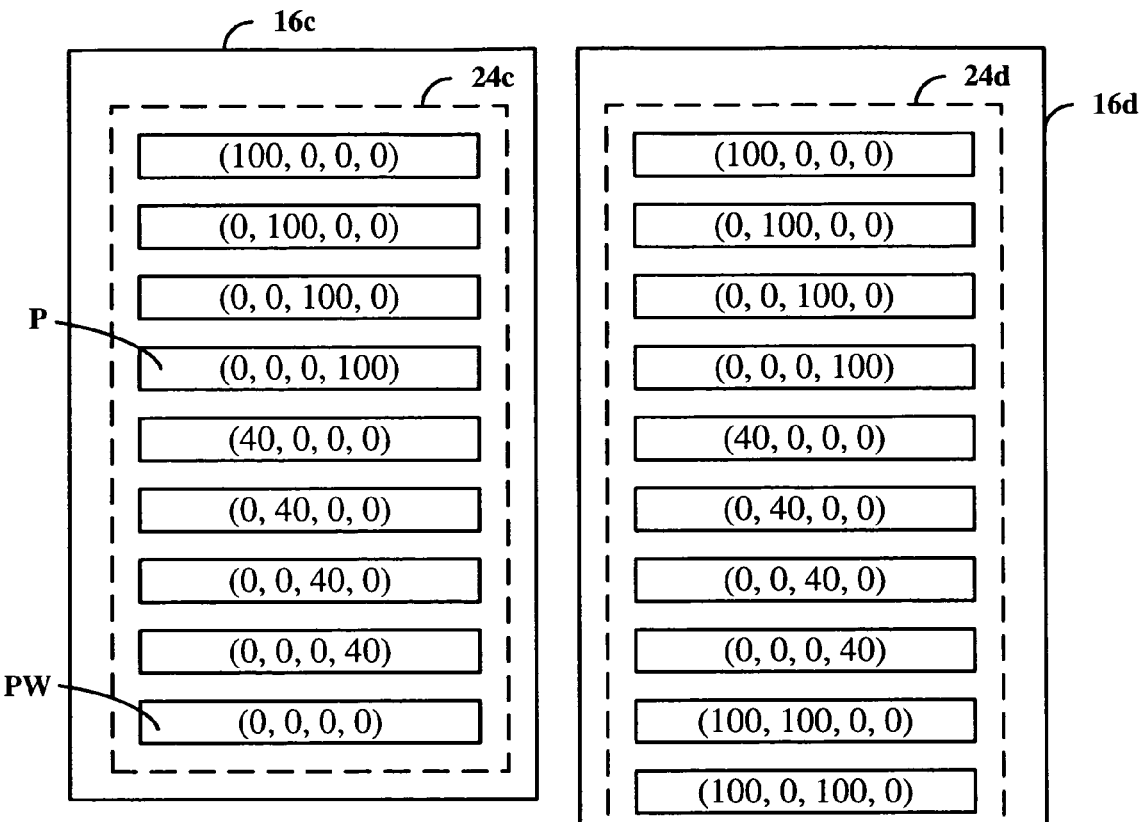

Beginning at step 32c, color output device 14 is used to print test pattern 24c including printed test patches P on output page 16. For example, a user of image source 12 may issue a print command to print image file 22c on color output device 14. An exemplary output page 16c including exemplary test pattern 24c is illustrated in FIG. 3C. Test pattern 24c includes eight printed patches P plus paper white patch PW. Persons of ordinary skill in the art will understand that test pattern 24c may include more than eight printed test patches P. However, because test pattern 24c includes a relatively small number of printed patches P, the test pattern may be printed alongside a print job, or in the trim area of a print job. Each printed test patch P is comprised of a corresponding specified percentage of colorants (e.g., C, M, Y and K) used by color output device 14. In particular, test pattern 24c includes one solid colorant patch for each colorant, and one midtone patch for each colorant (e.g., at 40%, 50%, or other similar midtone value).

Referring again to FIGS. 1 and 6, at step 34a, the spectral response is determined for each printed test patch P and paper white patch PW in test pattern 24c. For example, measurement device 18 may be used to determine spectral responses $R_C(\lambda)$, $R_M(\lambda)$, $R_Y(\lambda)$, $R_K(\lambda)$, $R_C(\lambda)$, $R'_M(\lambda)$, $R'_Y(\lambda)$, $R'_K(\lambda)$, and $R_W(\lambda)$ for the cyan solid, magenta solid, yellow solid, black solid, cyan midtone, magenta midtone, yellow midtone, black midtone, and paper white, respectively. Next, at step 36, spectral responses of shades of each colorant are determined by linearly interpolating between the spectral responses of the PW, midtone and solid patches. For example, spectral responses of 10%, 20% and 70% cyan may be determined by linear interpolation of $R_C(\lambda)$ and $R'_C(\lambda)$, $R_C(\lambda)$ and $R'_C(\lambda)$, and $R'_C(\lambda)$ and $R_W(\lambda)$, spectral responses, respectively.

Next, at step 38, the spectral response is calculated for overprint combinations of solid colorants based on the spectral response data for the individual colorants measured in step 34c. Thus, for a CMYK colorant system, the following spectral responses are calculated: $R_{CM}(\lambda)$, $R_{CY}(\lambda)$, $R_C(\lambda)$, $R_{MY}(\lambda)$, $R_{MK}(\lambda)$, $R_{YK}(\lambda)$, $R_{CMY}(\lambda)$, $R_{CMK}(\lambda)$, $R_{CYK}(\lambda)$, $R_{MYK}(\lambda)$, and $R_{CMYK}(\lambda)$, corresponding to cyan+magenta, cyan+yellow, cyan+black, magenta+yellow, magenta+black, yellow and black, cyan+magenta+yellow, cyan+magenta+black, cyan+yellow+black, magenta+yellow+black and cyan+magenta+yellow+black, respectively. For example, the spectral responses of the combination patches may be calculated using Beer's Law, as described above.

Next, at step 42a, colorimetric values are calculated for patches used in a color profiling target, such as patches having combinations of the shades of colorant used in step 36 and the midtone and solid colorants used in step 32c, based on the reflectance spectra calculated in step 38. Any conventional technique may be used to calculate colorimetric values for such patches. For example, the reflectance spectra $R(\lambda)$ for each patch may be calculated using spectral Neugebauer equations, as described above. As is known in the art, CIE tristimulus values XYZ may be determined from the calculated reflectance spectra for each patch in the color profiling target. Finally, at step 44, the colorimetric values calculated in step 42a may then be provided to any conventional profiling software for calculating the color profile for color output device 14.

Figure 7:
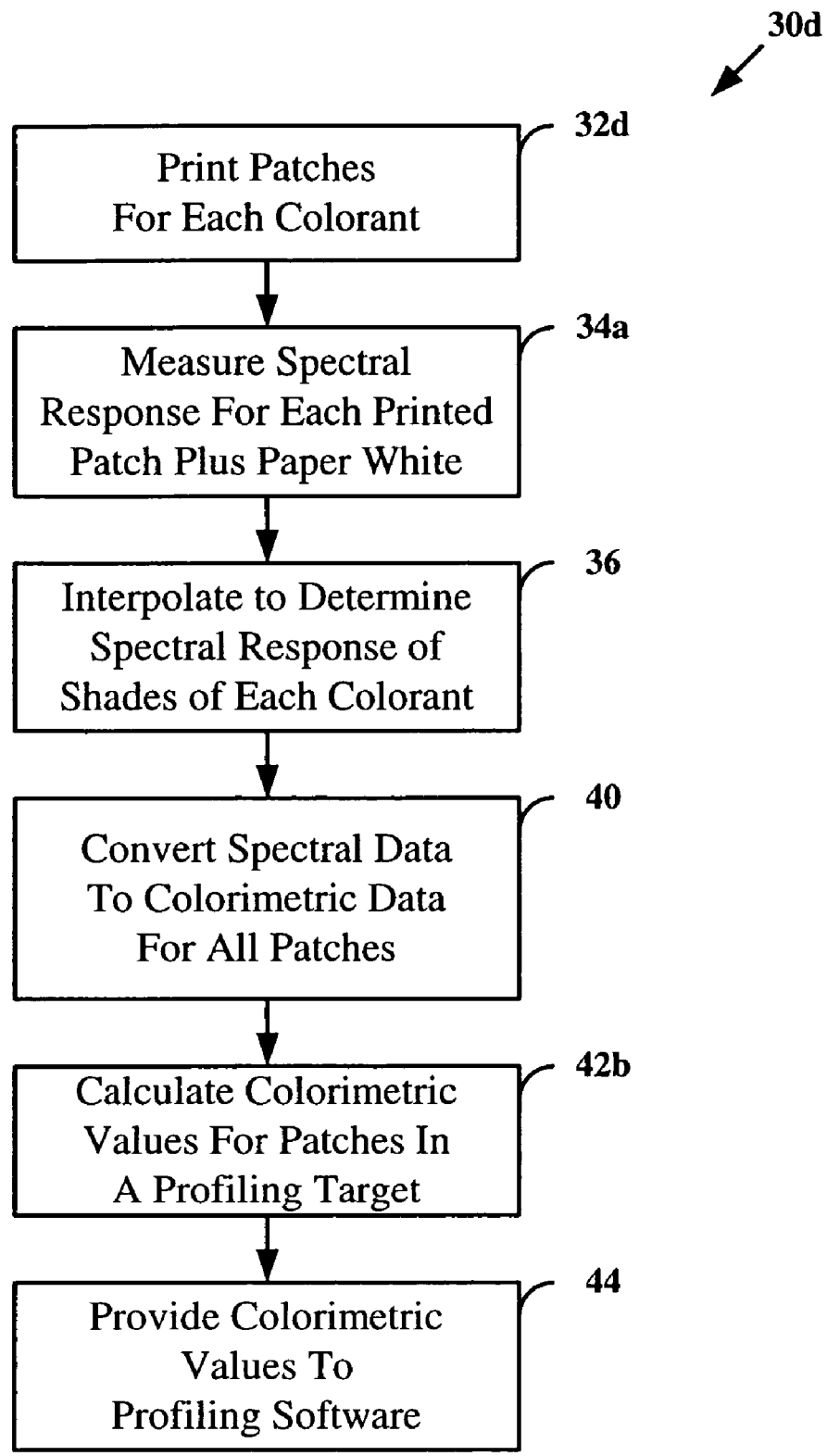
FIG. 7 is a flowchart of another alternative exemplary color profiling method in accordance with this invention.

Referring now to FIGS. 1 and 7, an alternative exemplary method in accordance with this invention that accounts for the effects of dot gain is described. In this alternative method, color output device 14 prints solid and midtone colorant patches for each of the individual colorants, plus overprint combinations of each solid colorant. In particular, beginning at step 32d, color output device 14 is used to print test pattern 24d including printed test patches P on output page 16d. For example, a user of image source 12 may issue a print command to print image file 22d on color output device 14. An exemplary output page 16d including exemplary test pattern 24d is illustrated in FIG. 3D. Test pattern 24d includes nineteen printed patches P plus paper white patch PW. Persons of ordinary skill in the art will understand that test pattern 24d may include more than nineteen printed test patches P. However, because test pattern 24d includes a relatively small number of printed patches P, the test pattern may be printed alongside a print job, or in the trim area of a print job. Each printed test patch P is comprised of a corresponding specified percentage of colorants (e.g., C, M, Y and K) used by color output device 14.

Referring again to FIGS. 1 and 7, at step 34a, the spectral response is determined for each printed test patch P and paper white patch PW in test pattern 24d. For example, measurement device 18 may be used to determine spectral responses $R_C(\lambda)$, $R_M(\lambda)$, $R_Y(\lambda)$, $R_K(\lambda)$, $R_C(\lambda)$, $R'_M(\lambda)$, $R'_Y(\lambda)$, $R'_K(\lambda)$, $R_{CM}(\lambda)$, $R_{CY}(\lambda)$, $R_{CK}(\lambda)$, $R_{MY}(\lambda)$, $R_{MK}(\lambda)$, $R_{YK}(\lambda)$, $R_{CMY}(\lambda)$, $R_{CMK}(\lambda)$, $R_{CYK}(\lambda)$, $R_{MYK}(\lambda)$, $R_{CMYK}(\lambda)$ and $R_W(\lambda)$, corresponding to solid cyan, solid magenta, solid yellow, solid black, midtone cyan, midtone magenta, midtone yellow, midtone black, cyan+magenta, cyan+yellow, cyan+black, magenta+yellow, magenta+black, yellow and black, cyan+magenta+yellow, cyan+magenta+black, cyan+yellow+black, magenta+yellow+black, cyan+magenta+yellow+black, and $R_W(\lambda)$, respectively.

Next, at step 36, spectral responses of shades of each colorant are determined by linearly interpolating between the spectral responses of the PW, midtone and solid patches. For example, spectral responses of 10%, 20% and 70% cyan may be determined by linear interpolation of $R_C(\lambda)$ and $R'_C(\lambda)$, $R_C(\lambda)$ and $R'_C(\lambda)$, and $R'_C(\lambda)$ and $R_W(\lambda)$, spectral responses, respectively. At step 40, spectral data for all measured patches are converted to colorimetric data. At step 42b, colorimetric values are calculated for patches used in a color profiling target, such as patches having combinations of the shades of colorant used in step 36 and the midtone and solid colorants used in step 32d, based on the colorimetric data calculated in step 40. Any conventional technique may be used to calculate colorimetric values for such patches. For example, the colorimetric values for each patch may be calculated using colorimetric Neugebauer equations, as described above. Finally, at step 44, the colorimetric values calculated in step 42b may then be provided to any conventional profiling software for calculating the color profile for color output device 14.

The foregoing merely illustrates the principles of this invention, and various modifications can be made by persons of ordinary skill in the art without departing from the scope and spirit of this invention.

The invention claimed is:

1. A computer-implemented method for generating a color profile for a color output device comprising a plurality of single colorant patches printed on a single substrate, the method comprising:
   instructing the color output device to print a test pattern from an image file;
   printing, with the color output device, the test pattern comprising a plurality of single colorant patches, one patch for each colorant comprising a solid color patch with 100% colorant and a print job on the same output medium;
   measuring a spectral response for each of the patches and for the output medium;
   calculating, with a processor, transmission spectra for each colorant and the output medium by using Beer's law;
   calculating, with the processor, a spectral response for an overprint combination of a first and a second colorant by multiplying the spectral response for the first colorant by the transmission spectra of the second colorant;
   calculating, with the processor, a spectral response combination for an overprint combination of the first, the second, and a third colorant by multiplying the spectral response for the first colorant by the transmission spectra of the second colorant and by the transmission spectra of the third colorant;
   calculating, with the processor, colorimetric values for each patch by using a spectral Neugebauer equation; and
   transmitting, with the processor, the calculated colorimetric values to profiling software for generation of the color profile for the color output device.

2. The method of claim 1, wherein the colorant comprises cyan, magenta and yellow.

3. The method of claim 1, wherein the colorant comprises cyan, magenta, yellow and black.

4. The method of claim 1, wherein the color output device comprises a printer.

5. The method of claim 1, wherein the color output device comprises a copier.

6. The method of claim 1, wherein the color output device comprises a printing press.

7. The method of claim 1, wherein printing further comprises printing the patches in a trim area of a print job.

8. A system for generating a color profile for a color output device comprising a plurality of single colorant patches printed on a single substrate, the system comprising:
   the color output device for receiving an image file for a test pattern and for printing the test pattern comprising a plurality of single colorant patches, one patch for each colorant comprising a solid color patch with 100% colorant and a print job on the same output medium;
   a measuring device for measuring a spectral response for each of the patches and for the output medium; and
   a processor for:
      calculating a transmission for each colorant and the output medium by using Beer's law,
      calculating a spectral response for an overprint combination of a first and a second colorant by multiplying the spectral response for the first colorant by the transmission spectra of the second colorant,
      calculating a spectral response combination for an overprint combination of the first, the second, and a third colorant by multiplying the spectral response for the first colorant by the transmission spectra of the second colorant and by the transmission spectra of the third colorant
      calculating colorimetric values for each patch by using a spectral Neugebauer equation, and
      transmitting the calculated colorimetric values to profiling software for generation of the color profile for the color output device.

9. The system of claim 8, wherein the colorants comprise cyan, magenta and yellow.

10. The system of claim 8, wherein the colorants comprise cyan, magenta, yellow and black colorants.

11. The system of claim 8, wherein the color output device comprises a printer.

12. The system of claim 8, wherein the color output device comprises a copier.

13. The system of claim 8, wherein the color output device comprises a printing press.

14. The system of claim 8, wherein the patches are printed in a trim area of a print job.

* * * * *

UNITED STATES PATENT AND TRADEMARK OFFICE
CERTIFICATE OF CORRECTION

PATENT NO.        : 7,688,486 B2                                        Page 1 of 1
APPLICATION NO.   : 10/836070
DATED             : March 30, 2010
INVENTOR(S)       : Markus Gießelmann It is certified that error appears in the above-identified patent and that said Letters Patent is hereby corrected as shown below:

In column 1, line 38-39, delete "calorimeter" and insert -- colorimeter --, therefore.

In column 1, line 62, delete "600 cm$^2$" and insert -- 600 cm$^2$, --, therefore.

In column 2, line 44, delete "calorimetric" and insert -- colorimetric --, therefore.

In column 2, line 48, delete "calorimetric" and insert -- colorimetric --, therefore.

In column 2, line 62, delete "calorimetric" and insert -- colorimetric --, therefore.

In column 2, line 64, delete "calorimetric" and insert -- colorimetric --, therefore.

In column 3, line 6, delete "calorimetric" and insert -- colorimetric --, therefore.

In column 3, line 7-8, delete "calorimetric" and insert -- colorimetric --, therefore.

In column 3, line 19, delete "invention" and insert -- invention; --, therefore.

In column 4, line 16-17, delete "calorimetric" and insert -- colorimetric --, therefore.

In column 6, line 51, delete "P-W" and insert -- PW --, therefore.

In column 7, line 64, delete "$R_C(\lambda)$," and insert -- $R_{CK}(\lambda)$, --, therefore.

Signed and Sealed this

Twenty-first Day of September, 2010

David J. Kappos
*Director of the United States Patent and Trademark Office*